Patented Aug. 6, 1946

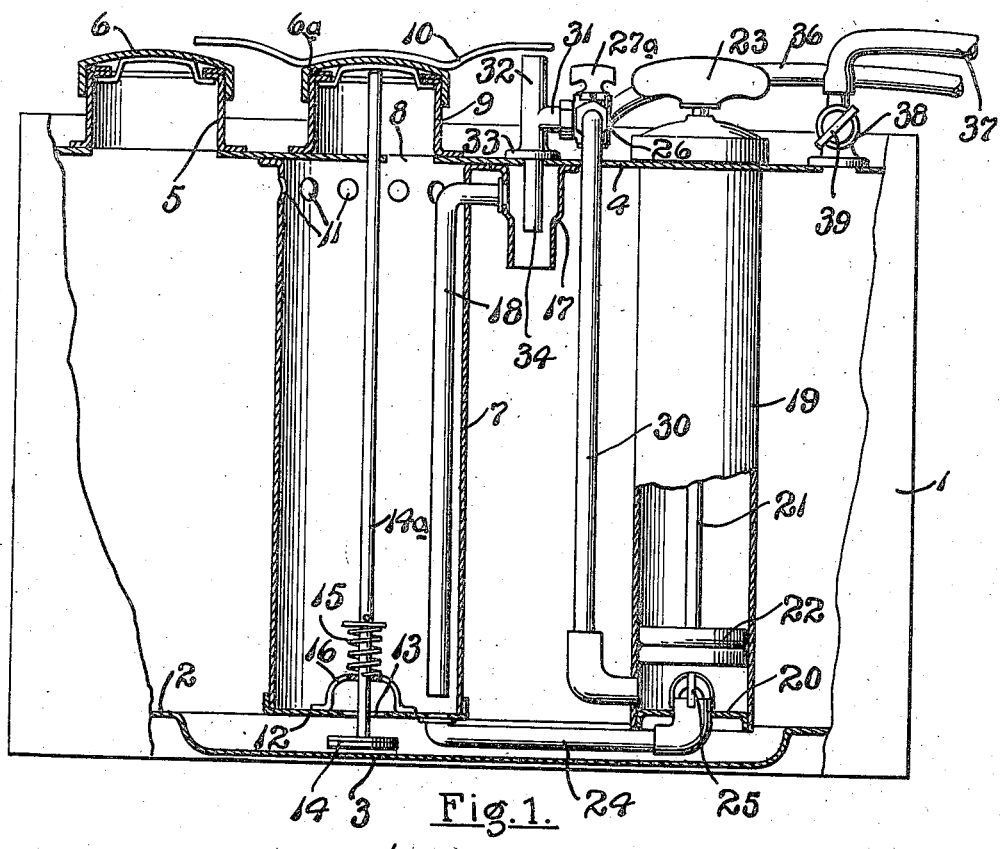

2,405,442

UNITED STATES PATENT OFFICE 2,405,442

AUXILIARY GASOLINE CONTAINER

Robert D. Mayo, Flint, Mich.

Application December 18, 1944, Serial No. 568,754

12 Claims. (Cl. 259—60)

This invention relates to an auxiliary gasoline container or tank and is primarily concerned with a novel construction of a gasoline fuel tank in which the fuel may be mixed with lubricant in a ready and easy manner, and from which the mixed fuel and lubricant may be transferred to the fuel containing tank of an engine under difficult conditions.

One place of use for the auxiliary tank which I have invented is in connection with the two-cycle engines of outboard motors on boats, or any other engines of similar type which are used whether in conjunction with outboard motors or otherwise. Also the tank is of utility in connection with motor cycle engines. Normally with outboard motors in which their fuel tanks are of relatively small capacity, the filling of the tank must at times be performed out on the water and away from shore and with the chance that the boat is far from stable, being pitched about by waves or rising and falling with changes in the surface conditions of the water. The entrance inlet to the tank being small, there are very strong possibilities that the fuel attempted to be introduced into the tank is spilled outside of it over the engine and over water and boat, the re-fueling of the tank being difficult and with such undesirable happenings. Also, with two-cycle engines, the oil lubricant for the engine is mixed with the gasoline fuel and such mixture should be done before introduction into the fuel tank for the engine. With my invention proper proportions of the gasoline fuel and of the oil to be intermixed therewith may be regulated, and the mixture of the oil and gasoline fuel very quickly and easily performed. Such intermixture may be most expeditiously performed at a service station where the gasoline fuel and oil are purchased, and my invention makes provision therefor. But if, as occurs in some cases, the gasoline fuel and oil lubricant are purchased at a service station and carried separately and later put in the auxiliary tank of my invention, means is provided whereby such intermixture may be readily performed manually. And finally, with the auxiliary tank which I have provided the transfer of its contents to the fuel tank of the motor on a boat is accomplished irrespective of weather conditions without waste of fuel, spilling thereof, or scattering more or less over the boat or adjacent water.

An understanding of the invention for the accomplishment of the ends stated, as well as others not at this time specifically enumerated, may be had from the following description taken in connection with the accompanying drawing, in which, Fig. 1 is a side elevation of the auxiliary gasoline fuel tank of my invention, parts being broken away and shown in section for a better disclosure of structure.

Fig. 2 is a plan view.

Fig. 3 is a partial vertical section and side elevation of the compressed air receiving injector means used in accomplishing the intermixture of the gasoline fuel and lubricant oil, and Fig. 4 is a fragmentary horizontal section substantially on the plane of line 4—4 of Fig. 3.

Like reference characters refer to like parts in the different figures of the drawing.

The main auxiliary tank of my invention, preferably of rectangular form, has vertical sides and ends 1 with a bottom 2 the intermediate portion of which is pressed downwardly as indicated at 3. It is closed by a top 4. The tank is made of sheet metal or equivalent material and all of the parts welded, brazed, soldered or otherwise permanently connected together. Adjacent one end of the tank an inlet neck 5 (Fig. 1) is provided for entrance of the gasoline fuel thereinto, the upper end of the neck being closed by a closure cap 6 of conventional structure.

Within the main tank 1, an auxiliary container having a barrel 7, preferably of cylindrical form, is located, being suspended from the underside of the top 4 which at the upper end of the container 7 has an opening 8 associated with which is a second inlet neck 9, the upper end being closed by a detachable cap 6a like the cap 6. Said cap 6a at its upper side is provided with a bar 10 made from flat metal, the end portions of which extend beyond opposite sides of the cap, one of said arms in the closed position of the cap 6a extending over the cap 6, as shown in Fig. 1. The other end portion of the bar 10 extends over the compressed air entrance stem as hereinafter described, preventing the connection of an air hose thereto except when the cap 6a is removed.

The barrel 7 near its upper end has a plurality of spaced openings 11 through its sides around it. It is closed at its lower end by a bottom 12 located a distance above the depressed portion 3 of the bottom 2 of the main auxiliary tank. The bottom 12 has a central opening 13 through it below which is a disk valve 14 connected at the lower end of a vertical rod 14a which extends upwardly through the barrel and through the top 4 and is engaged by the underside of the cap 6a, when it is secured in place to move the rod 14a and the attached valve 14 to the lower open position shown in Fig. 1 against the force of a coiled spring 15 located around the rod 14a and disposed between a foot bracket 16 and a disk (not numbered) which is held by a pin passing through the rod 14a as shown. When the cap 6a is removed it is evident that the spring 15 under compression lifts the valve 14 against the under side of the bottom 12 of the barrel 7 closing the opening 13.

To one side of the upper end portion of the barrel 7 an injector sleeve 17 of thin metal is vertically located and secured at its upper end to the lower side of the top 4 of the main tank. A tube 18 located mainly within the barrel 7 extends from its lower open end, near the bottom 12 of the barrel, nearly to the upper end thereof and then passes through a side of the barrel and communicates with the injector sleeve 17.

The container provided by the cylindrical barrel 7 with its bottom 12 is for the reception of lubricating oil which is entered thereinto with the closure cap 6a removed and the opening 13 closed. Said barrel 7 may be filled to the height of the openings 11 and when thus filled, and with the tank 1 filled with gasoline to the same height, the capacities of the tank 1 and the barrel 7 are such that the gasoline fuel and lubricant oil are in their proper proportions.

Spaced from the oil carrying cylindrical barrel 7 a pump cylinder 19 is vertically positioned within the tank, its lower end being closed by a bottom 20. At its upper end it extends through the top 4 and is equipped with a suitable upper end closure. A piston rod 21 passes downwardly through the upper closure of the pump cylinder 19 at its lower end having a valveless piston 22 secured and at its upper end provided with a handle 23 for manual reciprocation of the piston in the barrel of the pump.

A pipe 24 connects the lower ends of the oil container barrel 7 and the pump barrel 19. Said pipe is supplied with a check valve 25 at the end where it connects with the pump cylinder 19, so that on the upward stroke of the piston 22 liquid contents from the barrel 7 may be drawn into cylinder 19 below the piston but on the downstroke the check valve blocks its return.

Above the top 4 of the main auxiliary tank a valve housing 26 of a two-way character is located, having a three-way valve 27 mounted therein and adapted to be turned to a different position about its vertical axis by a projecting handle 27a. A passage 28 is made diametrically through the valve 27 (Fig. 4) connecting with which, and at right angles thereto, is a branch passage 29. A pipe 30 is connected with the valve housing 26 at one side and leads downwardly into the main tank and is connected at its lower end, through a suitable union, with the lower end portion of the barrel 19. On the downstroke of the piston 22 liquid contents drawn into the cylinder 19 is forced outward through the conduit 30, providing that the valve 27 is properly located so that an end of the passage 28 or the outer end of the passage 29 is in proper conjunction. A second check valve is provided in connection with the lower end of the pipe 30, permitting outward passage of liquid from the cylinder 19 but blocking its return.

In the construction shown a lateral branch 31 from a vertical stem 32 connects with a second side of the valve housing 26. The stem 32 is provided with a flange 33 resting upon and secured to the top 4, and has a downwardly extending extension 34 passing through said top 4 and located centrally of the injector sleeve 17 as shown in Fig. 1. In the upper end of the stem 32 a conventional valve 35, such as is used with the valve stems of tires, is mounted. The stem 32 and its extension 34 have vertical passage therethrough and upon applying the end of a compressed air carrying hose to the upper end of a stem 32, compressed air passes through said stem and from the lower end of its extension 34 into the injector sleeve 17, with the creation of a vacuum which draws liquid from the barrel 7 upwardly through the pipe 18 and delivers it into the main tank 1 below the lower end of the sleeve 17. Such attachment or connection of the outer end of an air hose to the upper end of the stem 32 is permitted only when the adjacent end portion of the bar 10 is out of the way, this being done by removal of the cap 6a with an accompanying closure of the opening 13 as previously described.

At the third side of the valve housing 26 a conduit 36, preferably of flexible character, is secured for leading to the tank of a motor which is to be supplied with the mixed gasoline and lubricating oil. The second flexible conduit 37 shown is adapted to be detachably connected with the fuel tank of the motor at an upper portion thereof to carry any overflow back to the auxiliary tank 1. The overflow conduit 37 is preferably connected with a valve housing 38 in which a manually operable valve 39 is mounted to be moved to closed position normally, but opened for accomplishing its function of returning overflow should the motor or engine tank be filled to full.

With the main auxiliary tank 1 filled with gasoline fuel to the openings 11, and with the smaller container 7 filled with the lubricating oil to the same level, at a service station, for example, the hose from a compressed air tank normally used for inflating tires may be placed in operative connection with the upper end of the stem 32. It is evident that in the filling the caps 6 and 6a must be removed and that the cap 6a must remain separated for the operative connection of the air hose with the upper end of stem 32. The compressed air moving rapidly through the stem 32 and extension 34 and through the injector sleeve 17 below post 34 will effect an emptying of the oil into the body of the gasoline fuel until all of the oil has been removed and delivered into the gasoline and that such action may continue as long as required, inasmuch as the volume of liquid within the tank 1 increased by the addition of the oil lubricant will raise the level to above the openings 11, through which there will be an overflow of mixed gasoline and oil back into the inner container 7 and a continuous mixing and remixing may follow until a completely thorough homogeneous mixture is obtained. Preferably this will be the condition under which the oil and gasoline are mixed together.

It is of course apparent also that if the level of gasoline and with a comparative level of oil in its container, reaches only a part of the height of the barrel 7 and not to the openings 11, the oil will be removed by suction and without overflow of liquid into the barrel through the openings 11. There will however be a substantially complete delivery of the lubricating oil to the gasoline fuel. And if it is desired to continue the intermixture after the oil has all been removed from its container, the upper end of the rod 14a may be pressed upon to unseat the valve 14, wherefore the gasoline containing the oil lubricant will flow through the opening 13 until the same level is reached within the barrel 7 as in the main tank 1, and the compressed air may be continued in passage with the valve 14 held in its down position as long as may be desired for completing the intermixture.

As previously described pumping the oil outward through the conveying conduit 36 may be done by operating the pump piston through the handle at 23, first turning the valve 27 to a position in which the passage 28 is in connection with the pipe 30 and conduit 36; and after the required amount of mixed gasoline fuel and lubricating oil has been conveyed to the motor tank the valve is to be closed.

The construction described is complete and fully operable and a construction thus far described may be made to accomplish the functions and results stated with an elimination of the lateral connection 31 and of the branch passage 29 in the valve 27. However the intermixture of the gasoline fuel and lubricating oil may be accomplished by operation of the pump under conditions when compressed air is not available. In such case with the gasoline fuel in the main tank 1 and the oil in the container 7 in their proper proportions to any height desired in the tank, with the cap 6a in place depressing valve 14 to open the opening at 13, the valve 27 is turned to connect the outlet pipe 30 of the pump with the branch connection 31, this being done by turning the branch passage 29 of valve 27 in connection with the branch at 31. Upon reciprocation of the piston 22 oil is drawn from the container 7 and pumped by the pump 19, passing through the branch 31 and stem 32 and thence flowing out of the lower end of the extension 34 into the gasoline fuel. The gasoline fuel will flow through the opening at 13, which is uncovered under such conditions, and intermingle with the oil to be pumped back into the normal gasoline holding portion of the tank and such pumping continue until a thorough intermixture has been attained. Of course the cap 6a may be removed while such pumping is done in which case if the tank is not full to the level of the openings at 11, the oil first will be pumped out of the container at 7 and delivered into the gasoline, while if the level of fuel and oil reaches such openings at 11 there will be a continuous overflow so that the pumping may continue indefinitely or as long as desired. Where the oil and gasoline are at a lower level, for a continuance of pumping after the oil has all first been withdrawn from its container 7, either the cap 6a is replaced or the valve 14 unseated by a manual depression thereof. Such further ability to intermix the gasoline fuel and lubricating oil by manual operation of the pump is desirable where facilities are not at hand for forcing compressed air through the stem at 32.

The tank construction described is very practical and satisfactory in operation. In the construction the top 4 of the tank carries all of the interior construction within the main tank, therefore the assembly is readily performed, the final step being the placing of the top with the parts attached in place and securing it to the sides and ends 1 of the main tank. The structure is usable under substantially all conditions with an assurance that the proper proportions of gasoline fuel and lubricating oil will be maintained. This follows whether initially the tank is completely empty of gasoline and oil, or is partly full. For example, if partly full of previously intermixed gasoline and oil, it is merely necessary to remove the caps 6a and 6 and fill the respective containing spaces provided for the oil and the gasoline and the proper portions will be maintained under such conditions.

Filling of the motor tank from this auxiliary tank not only results in saving of what has been previously wasted but there is an avoidance of the danger of water getting mixed with the fuel when filling the motor tank in the usual manner. The replenishment of the motor tank is substantially as easy in darkness as at any other time; and fire hazard is greatly reduced if not entirely limited, such for example the careless and dangerous habit of some of pouring gasoline into the motor tank while smoking. It is also evident, with the invention which I have made, that a standing up in a boat to pour the fuel into the motor tank, which many persons do is naturally not done.

While of great utility in the refueling of fuel tanks of outboard motors, the invention is also of utility for the proper mixture of gasoline and lubricating oil in connection with any two-cycle engine, one example of which has been previously mentioned, namely, the two-cycle engines used with motorcycles; and of course it is equally true for any two-cycle engines irrespective of its place of use.

The invention is defined in the appended claims and is to be considered comprehensive of all forms of structure coming within their scope.

I claim:

1. In a construction of the class described, a main receptacle having a bottom, vertical sides and ends and a top closing the upper end of the main receptacle, a secondary receptacle of smaller capacity secured at its upper end to the under side of said top and suspended therefrom with its bottom located above the bottom of the main receptacle, said bottom of the secondary receptacle having an opening therethrough, a valve located below the bottom of the secondary receptacle adapted in upper position to close said opening a vertical rod connected to the valve and extending through said secondary receptacle and through the top of the main receptacle, filling inlets connected to said top one over said secondary receptacle, through which said receptacles may be supplied with liquid, closure caps for said filling inlets, the closure cap for the inlet to the secondary receptacle bearing against the upper end of the rod to move said valve to a lower position, spring means normally elevating the valve to closing position when free to do so, a conducting pipe extending through a side of said secondary receptacle near the upper end thereof extending downwardly substantially to its bottom, and means for withdrawing liquid through said conducting pipe from the secondary receptacle and delivering it for mixture with liquid in the main receptacle.

2. A construction as defined in claim 1, said secondary receptacle near its upper end having an opening through a side thereof.

3. In a construction as defined, a main tank receptacle having a bottom, upwardly extending sides and ends and a top closing said tank at its upper end, a secondary tank receptacle connected to and suspended from the top within the main tank having a bottom located above the bottom of said main tank, separate inlet means for filling said main and said secondary tanks each with a liquid differing from the other, and means mounted on and above the top of said main tank and extending therethrough for the passage of compressed air into said main tank combined with ejector means associated therewith and extending into the secondary tank for withdrawing liquid from the secondary tank and delivering it to the liquid in the main tank.

4. A construction as defined in claim 3, combined with means preventing the passage of compressed air through said compressed air carrying means except when free communication is provided between the interior of said main tank and the outside atmosphere.

5. A construction as defined in claim 3, said secondary tank having openings through its sides near its upper end, said inlet means therefor having a removable closure cap, an arm extending laterally therefrom which when the cap is attached extends over said compressed air passage means, whereby air cannot be passed therethrough when said closure cap is in secured operative position.

6. In a construction as described, a main tank having a bottom, generally vertical sides and ends and a top closing said main tank at its upper end, said main tank having liquid entrance means thereto and a removable closure cap for sealing said entrance means, a secondary smaller tank located within the main tank and connected to and suspended from the top and having a bottom with an opening therethrough, said bottom located above the bottom of the main tank and said top having an opening at the upper end of said secondary tank, the sides of said secondary tank near the upper end thereof having openings therethrough, said secondary tank being adapted to receive liquid through said opening in the top of the main tank, a removable closure for said opening, a rod extending through said opening in the bottom of the secondary tank and through the top of the main tank, spring means normally elevating said rod, closure means for covering said opening in the top of the main tank through which the secondary tank receives liquid to bear against the upper end of said rod and move it downwardly when said closure means is in place, a valve at the lower end of the rod below the bottom of the secondary tank, an injector sleeve connected to the under side of the top of the main tank and depending therefrom, a pipe located within the secondary tank having an open end near the bottom thereof, said pipe extending vertically within the secondary tank and passing through a side thereof near its upper end and communicating with said injector sleeve, and a compressed air passing stem mounted upon and having a lower portion passing through the top of the main tank and an upper portion extending thereabove, said lower portion being located within said injector sleeve and terminating above the lower end of said sleeve.

7. A construction as defined in claim 6, and movable guard means extending over the upper end of said compressed air passing stem, said guard means when in such position preventing access to the stem for passage of compressed air and when moved to permit such access permitting the passage of air from within the main tank to the outside.

8. In a construction of the class described, a main tank having a bottom, sides and ends and a top, closable inlet means for introducing liquid into said main tank, a secondary tank within the main tank connected to the top and suspended therefrom, having a bottom located above the bottom of the main tank, a pump barrel located within said main tank and suspended from the top thereof, a valveless piston in said pump barrel, means for reciprocating the piston from above the tank, inlet means for introducing a liquid into said secondary tank, a pipe connection between the bottoms of said secondary tank and barrel, a pipe outlet connected at one end to said barrel immediately above the bottom thereof having means for emptying into the main tank, said secondary tank above the bottom having openings through its sides.

9. A construction as described in claim 8, the bottom of the secondary tank having an opening therethrough, a spring actuated valve normally closing said opening and means for moving said valve away from said opening, as specified.

10. In a construction as described, a main tank for receiving liquid having, a top, a secondary tank within the main tank suspended from said top, said secondary tank having an opening in the lower part thereof for communication between said tanks, a spring actuated valve closing said opening, means for moving the valve to open position, a pump having a barrel within the tank suspended from the top, a valveless piston within said barrel, a pipe connection between the lower ends of said secondary tank and barrel and an outlet pipe connected at one end to the lower portion of the barrel below the lowermost position of said piston to deliver liquid pumped into the main tank, said pipe connection and outlet pipe having check valve means permitting flow of liquid into the barrel pump on upstroke of the piston and flow of liquid out of said barrel on the downstroke thereof and preventing opposite flows in said pipe connection and outlet on the downstroke of the piston and upstroke thereof, respectively.

11. In a construction of the class described, a main tank having a bottom, sides and ends and a top, closable inlet means on said top for entering liquid into the main tank, a secondary tank within and suspended from said top having its bottom located above the bottom of the main tank, closable inlet means therefor, a vertical disposed injector sleeve connected to and extending downwardly from the under side of the top of the main tank, a pipe connected at one end to said sleeve between its upper and lower ends and extending into said secondary tank substantially to the bottom thereof, a pump barrel located within said main tank and suspended from said top, a valveless piston in the barrel, means for reciprocating the piston from above the tank, a pipe connection between the lower ends of said secondary tank and barrel, a stem having a passage therethrough mounted on and extending partly through said top and into said injector sleeve, its lower end terminating above the lower end of said sleeve, said stem having a lateral branch, a three-way valve housing connected to said branch, a two-way valve therein, a pipe connected at one end at one side of the valve housing and at its opposite end to the lower portion of said barrel, an outlet conduit connected at the opposite side of said valve housing, said secondary tank having openings therethrough providing communication between the interiors of said main and secondary tanks.

12. The elements in combination defined in claim 11, one of said openings in the secondary tank being in the bottom thereof, a spring actuated valve normally closing said opening and manual means accessible from above the tank for moving said valve to open position.

ROBERT D. MAYO.